(12) United States Patent
Zimmermann et al.

(10) Patent No.: US 11,794,957 B2
(45) Date of Patent: Oct. 24, 2023

(54) SEALING SYSTEM FOR CONTAINER COMPRISING A MATERIAL

(71) Applicant: STRATEC SE, Birkenfeld (DE)

(72) Inventors: Sara Zimmermann, Schömberg (DE); Thomas Lowien, Pforzheim (DE); Martin Trump, Pforzheim (DE)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 17/830,833

(22) Filed: Jun. 2, 2022

(65) Prior Publication Data

US 2022/0402661 A1    Dec. 22, 2022

(30) Foreign Application Priority Data

Jun. 17, 2021  (LU) ......................................... 102830

(51) Int. Cl.
*B65D 41/32*       (2006.01)
*B65D 17/28*       (2006.01)

(52) U.S. Cl.
CPC ......... *B65D 41/325* (2013.01); *B65D 17/404* (2018.01)

(58) Field of Classification Search
CPC ...... B65D 41/325; B65D 41/32; B65D 47/36; B65D 55/024; B65D 17/4012; B65D 17/404; B65D 1/0238; B65D 2543/00546; B65D 2401/15
USPC ....... 220/266, 268, 265, 803, 802, 804, 806, 220/801; 215/253, 250; 222/562
See application file for complete search history.

(56) References Cited

U.S. PATENT DOCUMENTS

2015/0025184 A1   1/2015  Du et al.
2016/0003861 A1   7/2016  Brennan
2018/0168930 A1   6/2018  Tunesi

*Primary Examiner* — Robert J Hicks
(74) *Attorney, Agent, or Firm* — 24IP LAW GROUP USA, PLLC; Timothy DeWitt

(57) ABSTRACT

A sealing system for container comprising material and a method using the system. The present invention provides a sealing system for sealing a container comprising material, wherein the system comprises at least a first part which is a cap for sealing a container comprising a seal; and a second part which is a coupling member that is mounted to a dispenser unit, wherein the coupling of both parts with each other is configured that they can be twisted against each other while preventing axial movement of first and second part.

14 Claims, 4 Drawing Sheets

SEALING SYSTEM FOR CONTAINER COMPRISING A MATERIAL

CROSS-REFERENCE TO RELATED APPLICATIONS

The present invention claims priority to national Luxembourg patent application no. LU102830 filed on Jun. 17, 2021. The aforementioned application is incorporated herein by reference.

BACKGROUND OF THE INVENTION

Field of the Invention

The invention relates to a sealing system for container comprising material and a method using the system.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

STRATEC designs and manufactures automated analyzer systems like diagnostic systems for biochemically processing samples, in particular patient samples. Such analyzer systems usually have a liquid handling device, which comprises a container comprising material like a bottle containing consumable fluids, an aspiration line connected to an outlet of the bottle, and a dispensing pump with a dispense line connected to an injection nozzle. The bottle represents the sole consumable part in the liquid handling device. All of the other components are integrated within the diagnostic system and can only be replaced with some difficulty.

Published U.S. Patent Application No. US 2015/0251840 A1 discloses a dispenser unit. The dispenser unit comprises a fluid reservoir, a tag for storing information, a dispenser head having a pump chamber and at least one injector nozzle, and a means disposed at the dispenser head for its attachment to a diagnostic system, wherein the pump chamber comprises a piston and the piston comprises a volume which can be filled with fluid.

From a chemical point of view, a container like a bottle can contain material like a liquid with different properties (acids or alkalis). The properties of a liquid as material may have an influence with respect to the functionality and service life of the component with which they get in contact, e.g., valves in a syringe unit.

Published U.S. Patent Application US 2018/168930 A1 discloses a container system having at least two containers, wherein the container system comprises a light member which is configured to provide information through the emission of light, wherein the container system is configured to provide or trigger the light member to provide the information through the emission of light when a step related to preparing a mixture of contents of the containers is performed. In particular, triggering occurs when the containers are separated from one another and/or when a fluidic connection is created between the containers.

Published U.S. Patent Application US 2016/003861 A1 teaches an analyser for use with in vitro diagnostics includes one or more containers. Each container includes a container body configured to hold one or more fluids, a closure device disposed on the container body and housing a movable cannula, and a sealing portion configured to seal off the one or more fluids in the container body from matter outside the container body when the sealing portion is closed. The system also includes one or more pick and place devices configured to move the one or more containers between different locations. The movable cannula is configured to move downward responsive to a force from the one or more pick and place devices and cause an opening in the sealing portion.

The usability or lifetime of a dispensing unit that is connected to a container comprising a material may be limited without separating a material by a seal. Immediately after the container and the dispensing unit are filled and connected, the chemicals in the material may act on parts of the dispensing unit's components. Conversely, released products from the mechanical components will probably change properties of a material stored in the container, affecting the shelf life of the material.

It is in particular for the soft, elastic components which are used in seals or valves very difficult to find alternative materials which will be inert to specific chemical properties of a material. This is in so far a problem, as different materials may have oppositional effects to a surfaces or material of a mechanical component so that their material would have to be inert with regard to a wide range of chemical properties.

Thus, there is a need for a sealing of materials which are stored in and provided by a container in order to protect in particular functional parts of an automated analyser system and to minimize or restrict the contact of a material with such parts to the inner walls of a container like a bottle as long as it is not used or required during processing.

SUMMARY OF THE INVENTION

It is therefore the object of this invention to provide a device and a method for sealing material in a container.

The present invention provides a sealing and coupling system for sealing a container comprising material and coupling of said container to a dispenser unit, wherein the system comprises two parts, a first part is a cap and a second part is a coupling member, wherein the cap is configured to be connected to a container and comprises a seal for sealing of the container, wherein the seal of the cap is surrounded by a predetermined breaking line for opening of the seal, and the cap further comprises a seal ramp directed towards the coupling member that is configured to be mounted to a dispenser unit, wherein the coupling member comprises an opening ramp that is directed towards the cap, and wherein the two parts comprise an external and an internal thread, respectively, so that they can be connected and twisted against each other for their coupling while an axial movement of first and second part in the longitudinal direction of any one of both parts is impossible, wherein the seal ramp and the opening ramp get in contact when the cap is coupled through a rotational movement to the coupling member, wherein at least one of the seal ramp and the opening ramp has an increasing height regarding the respective other ramp.

In a further aspect of the invention, the predetermined breaking line can be formed by a circular line of thinner material in comparison to the surrounding material.

In another embodiment, the predetermined breaking line can be formed by a connecting element between seal and cap.

It is further envisaged that the coupled first and second part are arranged in an inactivated position in an angle of about 110° to 130° with respect to another.

The coupled first and second part can be aligned in an activated position when the connected container and dispenser unit are not angled with respect to their longitudinal extension.

It is also intended that the opening ramp is a protrusion with an increasing height.

The invention refers further to a system, wherein the cap has at least one latch engaging into a toothing of the connected coupling member.

The container can be a bottle.

In another embodiment, the container comprises a fluid, a liquid, a gas, a solid or mixtures thereof.

Another object of the invention relates to a method for controlling the provision of a material from a container, comprising the steps of
- mounting a cap to the container, wherein the cap comprises an unbroken seal;
- mounting a coupling member to a dispenser unit or providing the dispenser unit with a coupling member, wherein at least the coupling member comprises a ramp with increasing heights directed towards the outer surface of the seal of the cap;
- connecting cap and coupling member through a combination of an internal and an external thread;
- applying a pressure to the seal by twisting cap and coupling member against each other;
- breaking the seal along a breaking line for opening of the seal.

The method may further comprise the step that a twist-back of cap and dispenser unit is prevented by at least one latch of the cap engaging into a toothing of the dispenser unit.

The method relates in another embodiment to a cap and dispenser unit which are brought by twisting from an inactivated position with unbroken seal and an angle of about 110° to 130° with respect to the two parts to an activated position when the connected container and dispenser unit are aligned with respect to their longitudinal extension.

Another object of the invention is a method for the use of a system as described above for sealing of a container comprising a material and coupling of the container to a dispensing unit.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

Figure 1:
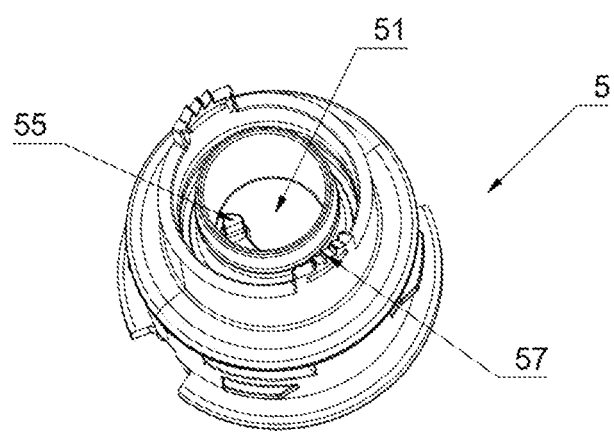
FIG. 1 shows a cap with seal.

The technical problem is solved by the independent claims. The dependent claims cover further specific embodiments of the invention.

The term container refers within the meaning of the present disclosure to any receptacle or enclosure that is suitable to comprise a material like fluids, liquids, gases or solids or mixtures thereof.

A seal within the meaning of the present disclosure relates to a surface or an area which is flat and surrounded by a breaking line within the meaning of a line serving as predetermined breaking of material at along a defined direction. The breaking line may for instance be formed by a circular line of thinner material in comparison to surrounding material so that pressure will result in a breakage of the material along the line of thinner material.

The seal may be part of the cap and both, cap and seal can be produced in one part by molding of the cap comprising the seal surrounded by the break line of thinner material. It is obvious for a person having ordinary skill in the art that a seal can also be made of a different material and added to the cap. The breaking line may also be formed by a connecting element between seal and cap which is configured to be released from the cap when pressure is applied. It is preferred that the seal will remain connected to the cap at least partly or at one point or side after breakage along the break line so that it is not completely released but opened due to the resulting opening in the cap.

The present invention provides a system using a cap with a seal or separating element which is attached to the container to keep material in a container, like liquids in a bottle, away from any functional components of an analyser system like a dispensing unit for instance. This allows for long storage times of materials and protects mechanical parts of an analyser system like a dispensing unit from any unnecessary contact with materials that may be harmful to the material or surfaces of such components. A liquid may enter a dispensing unit only following breakage of the seal after activation, wherein breakage of the seal is indicated by the relative position between container and a dispenser.

A system according to the present disclosure comprises at least two parts, wherein a first part acts like a cap with a closed seal on a container. The container content is thus kept in the container and can therefore not affect adjacent components by getting in contact with their surfaces. The second part is a coupling member which can be attached to a dispensing unit. A broken seal in the cap is indicated by a change in the relative position between container with cap and dispenser unit with coupling member. In a so-called inactivated position, the container with cap is angled with respect to the dispenser unit bearing the coupling member (comp. FIG. 5). The inactivated position can also be regarded as a start position for opening the seal and thus the container. Container and dispenser unit may have an angle in the inactivated position with regard to each other in a range of about 110°-130°. Such a rotation angle may be required for opening the seal reliably through the ramps that get in contact. The stroke of the ramps must be large enough so that the seal can be reliably opened. It is to be noted that the coupling member can be a part of the dispenser unit or can be a separate part that is attached to the dispenser unit.

In an activated position, the container is aligned with the dispenser unit bearing the coupling member. In the activated position is the container aligned with the dispenser unit, which means that there is no angle between them in their longitudinal extension. The container is connected to the cap and the dispenser unit is connected to the coupling member. Inactivated and activated position can thus be distinguished by different relative positions between the container and dispenser unit coupled to cap and coupling member when looking at them along their longitudinal axis.

When the cap on a container according to the present invention is twisted within the coupling member, the seal will be opened—at least partly—by breaking the seal at least in part along the above-described pre-defined breaking line and the dispenser unit continues to engage with the cap of the container and cannot be turned back. A potential damage to the seal is thus indicated by a changed in the angle, respectively the position between container and dispenser unit.

The invention relates to a sealing system which comprises two components or parts that are movably connected to each other and can be twisted relative to each other:
a. A first part is a seal cap:
    The seal cap which is configured to be connected to a container, and it comprises a seal and represents the actual sealing component that comes into contact with a material that is stored in the container. The seal cap acts like a closure of the container and comprises a seal ramp as a first activating component for breaking the seal along a predefined break line. The seal ramp provides increasing height directed towards the second part of the sealing system.
b. A second part is a coupling member which is configured to be connected to a dispenser unit that is then connected to the container with cap which stores a material that is required for performing assays in an automated analyzer system:
    The coupling member configured to be connected to the dispenser unit comprises an opening ramp as a second activating component. The opening ramp is a protrusion that comprises a ramp with an increasing height facing the seal of the seal cap, or the seal ramp. Cap and coupling member are locked in an initial, so-called inactivated position between container and dispenser unit to prevent unintentional breakage or opening of the seal during transport of the whole unit. When the seal is broken along a predefined break line, the coupling member which is connected to the dispenser unit continues to rotate in the cap connected to the container until the seal is fully opened and the seal will be kept open, because the coupling member connected to the dispenser unit is fixed in the final, activated position to the cap and the container and cannot rotate back into a previous position including the inactivated position. It is obvious that the dispenser unit will make the same movements as the coupling member as it is fixed to the dispenser unit. The container will make the same movements as the cap. By locking in intermediate positions, even a partially broken seal may be indicated by the respective position between container with cap and coupling member, because the at least two components have been rotated relative to each other so that it becomes obvious that the seal has been broken.

As already mentioned, the seal arranged in the cap is connected to the coupling member of the dispenser unit. Cap and dispenser unit (through the coupling member) can be twisted against each other but cannot be moved axially. It is obvious for a skilled person that a combination of an internal and external thread may be used for achieving such a connection. While twisting, the seal ramp of the cap and the opening ramp of the coupling member of first and second part of the sealing system get in contact. The seal in the cap breaks along the predefined breaking line and is folded towards the inner part or volume of the connected container, thus remaining partly connected to the cap, e.g., on one side. A combination of a toothing and a latch ensures that cap and dispenser unit (through coupling member) cannot be turned back. The relative position of the parts of the system, respectively the connected container or dispenser unit indicates whether the seal is undamaged or has already been broken, at least partly.

The present system for sealing and coupling of a container like a bottle which comprises a material like a liquid, to a dispenser unit increases the reliability of the whole analyser system to which the dispenser unit connects the container via the cap. The container is hermetically sealed, and material that is comprised in the container can thus even not reach the coupling member of the dispenser unit and consequently not a dispensing unit that may be connected to the dispenser unit. This eliminates the possibility of leaks during storage and transport or unintentional dispensing during handling.

In the hermetically sealed system, the material which is inside a container comes only into contact with the inside of the container and with the inside of the cap up to its seal, which is made of the same material the container is made of. There can be no chemical interactions with components from the dispenser unit or the coupling member attached to the dispenser unit. It is thus to be expected that the material in the container will have a much longer shelf life.

The same applies to container and a dispenser unit: Since a liquid from the bottle can only enter the dispenser unit after the seal is broken, it can be expected that both parts will have a longer operating time, because the exposure time to chemicals of the components in the dispensing unit is reduced, which drastically improves the shelf life and functionality of the dispensing unit (in long term use).

The seal is activated by rotating the dispensing unit or the bottle relative to the respective other part of the sealing system. As already said, it is obvious for a skilled person that corresponding threads of cap and coupling member may serve for such a connection, wherein one part has an external thread and the respective other part an internal thread. It will be possible to identify an intermediate position through the movement of the latch in the toothing which cannot be reversed. In another embodiment, the parts may snap from a "locked" or "sealed" position into an "open" position. Once activated the two parts cannot be turned back. In such an embodiment is an intermediate position between the two parts excluded.

When using a bottle as container comprising a material which is a consumable and a dispenser unit of an automated analyzer system, various information may be relevant
- c. Consumable:
  - i. Production data
  - ii. Ingredients of the consumable (type of liquid, date of filling,)
  - iii. volume
- d. Dispensing Unit
  - i. production data of used components
  - ii. material
  - iii. Dispensing volume Such information can be stored on a RFID tag on the dispenser unit and will be retrieved by the device and changed as needed (e.g., volume adjustment after each dispensing step). If a container is stored separately from the dispenser unit and is only joined with the dispenser unit when the device is loaded, it must be ensured that the information on the container is correctly stored on the RFID tag at that time. It is therefore advantageous to connect the two parts directly at the time of production.

FIG. 1 shows a cap 5 with a seal 51. The cap has a seal ramp 55 that it is located on the outside of the seal so that it can interact with a mounted connecting member 11 of a dispenser unit (not shown). The cap has further latches 57 directed towards the outside on its outer end which is a ring. The latches are intended for preventing that the cap can be twisted back into a previous position by its interaction with a toothing of the coupling member. The cap can be fixed to the container by a snap-fit mechanism, gluing or a threaded connection. It is also envisaged that the cap is part of a container.

Figure 2:
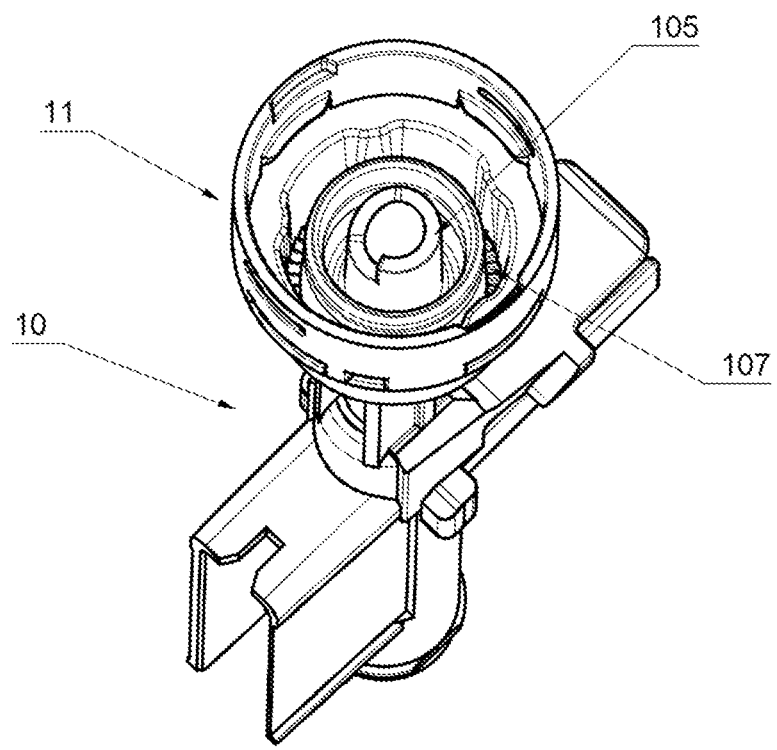
FIG. 2 shows a coupling member and a dispenser unit for coupling a container to the dispenser unit.

FIG. 2 shows a coupling member 11 that is mounted to or part of a dispenser unit 10 with an opening ramp 105 located inside the coupling member. The opening ramp 105 is directed towards a cap so that it can get in contact with the seal ramp 55. It can further be taken from FIG. 1 and FIG. 2 that cap and coupling member can be connected via a snap fit. The coupling member can be fixed to the dispenser unit by a snap-fit mechanism, gluing or a threaded connection. It is also envisaged that the coupling member is part of the dispenser unit.

It can also be taken from FIG. 1 that the seal ramp 55 and the opening ramp 105 will be in contact in an inactivated state of the sealing system. Pressure will be applied to seal 51 by twisting the two components against each other until seal 51 will break at the indicated break line 53 (FIGS. 3A and 3B) and thus becomes opened. A rotation back in a previous position is prevented by toothing 107 of the coupling member 11 into which latches 57 of the cap engages.

Figure 3A:
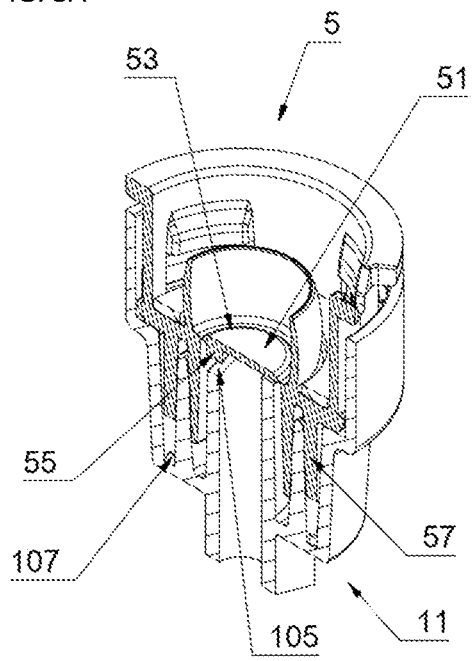
FIGS. 3A and 3B show sectional views of a cap with closed seal.
Figure 3B:
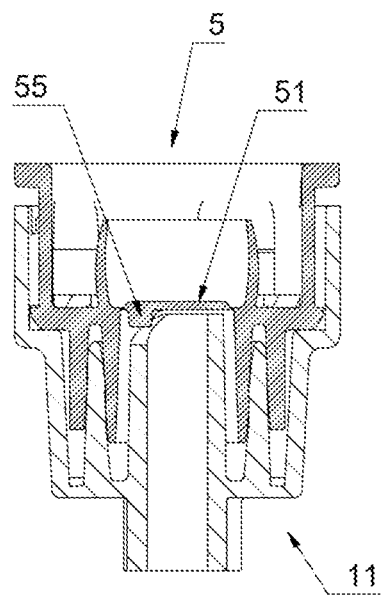
Figure 4A:
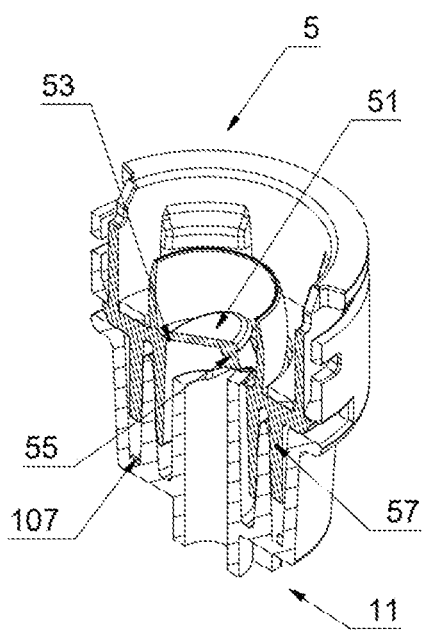
FIGS. 4A and 4B show sectional views of a cap with broken seal.
Figure 4B:
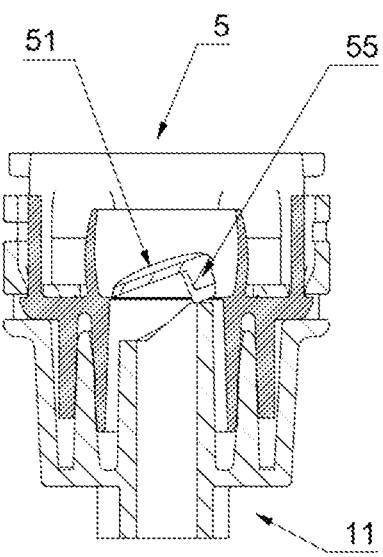

FIGS. 3A and 3B show sectional views of a cap 5 with a closed seal 51 that is mounted to a coupling member 11. The seal ramp 55 is arranged next to or opposite the opening ramp 105 of the coupling member 11. When both parts are twisted, the ramps 55, 105 get in contact and seal 51 will break along break line 53 so that the container will be opened (FIGS. 4A and 4B). Latches 57 extend into a toothing of the coupling member 11 and interact with toothing 107 (comp. FIG. 2).

Figure 5A:
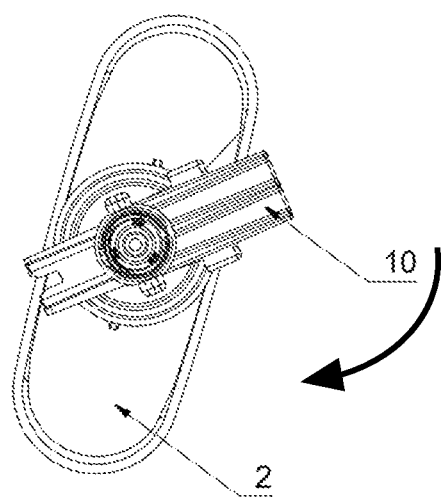
FIGS. 5A and 5B show a cap mounted to the coupling member with a closed seal (not aligned).
Figure 5B:
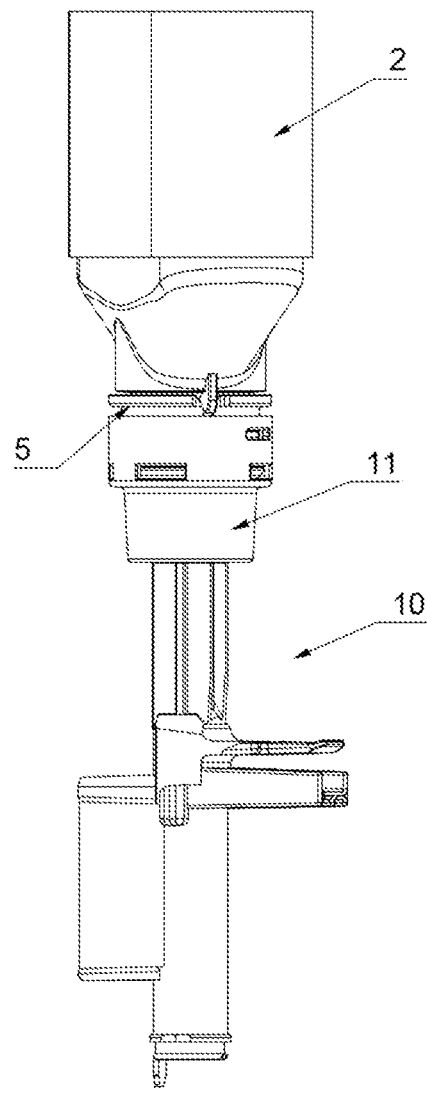

FIGS. 5A and 5B show a container 2 that is coupled through cap 5 which is mounted to coupling member 11 to a dispenser unit 10. The container 2 has a closed seal (not shown) and is thus not aligned with dispenser unit 10 so that a user will realize that the seal is still closed. The arrangement between container 2 and dispenser unit 10 can be regarded as being in a starting position. The arrow indicates the direction for the rotational movement that will be necessary for opening of the seal.

Figure 6A:
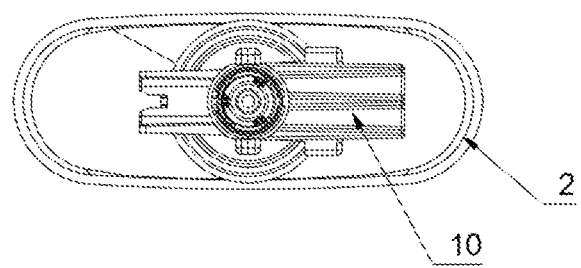
FIGS. 6A and 6B show a cap mounted to a coupling member in an aligned position indicating a broken seal.
Figure 6B:
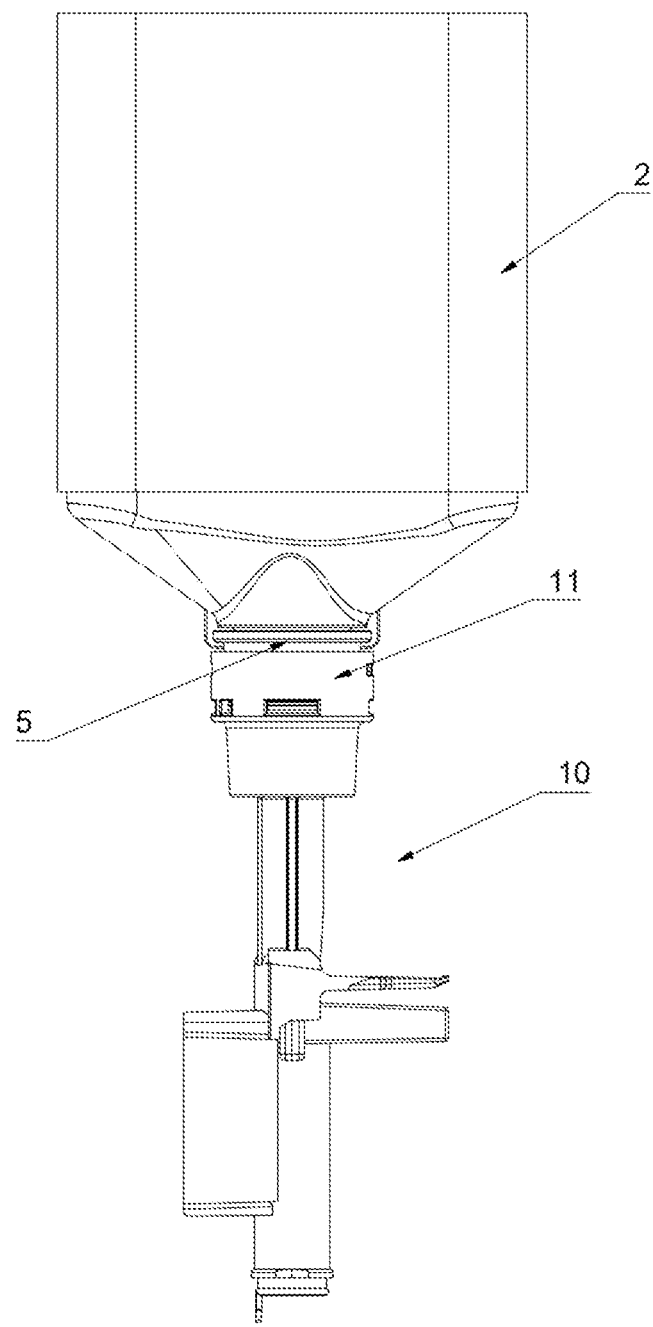

FIGS. 6A and 6B show a container that is coupled through cap 5 which is mounted to coupling member 11 to a dispenser unit 10. Container 2 and dispenser unit 10 are aligned meaning that they are both arranged in the same direction.

The advantages of a system according to the present disclosure relate to allowing the connection between a liquid containing container like a bottle to a dispensing unit while keeping the liquid sealed in the respective container. Moreover, another advantage of the present systems is that it allows to easily identify whether the liquid is still sealed in the container or whether the container is already opened (by a broken or partly broken seal) so that the liquid can get in contact to parts of a dispensing unit.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 2 container
5 cap
51 seal
53 break line
55 seal ramp
57 latches
10 dispenser unit
11 coupling member
105 opening ramp
107 toothing

What is claimed is:

1. A sealing and coupling system for sealing a container comprising material and coupling of said container to a dispenser unit, wherein the system comprises two parts, a first part is a cap and a second part is a coupling member, wherein the cap is configured to be connected to a container and comprises a seal for sealing of the container, wherein the seal of the cap is surrounded by a predetermined breaking line for opening of the seal, and the cap further comprises a seal ramp directed towards the coupling member that is configured to be mounted to a dispenser unit, wherein the coupling member comprises an opening ramp that is directed towards the cap, and wherein the two parts comprise an external and an internal thread, respectively, so that they can be connected and twisted against each other for their coupling while an axial movement of first and second part in the longitudinal direction of any one of both parts is impossible, wherein the seal ramp and the opening ramp get in contact when the cap is coupled through a rotational movement to the coupling member, wherein at least one of the seal ramp and the opening ramp has an increasing height regarding the respective other ramp.

2. The system of claim 1, wherein the predetermined breaking line is formed by a circular line of thinner material in comparison to the surrounding material.

3. The system of claim 1, wherein the predetermined breaking line is formed by a connecting element between the seal and the cap.

4. The system of claim 1, wherein the coupled first and second part are arranged in an inactivated position in an angle of about 110° to 130° with respect to another.

5. The system of claim 1, wherein the coupled first part and second part are aligned in an activated position when the connected container and dispenser unit are not angled with respect to their longitudinal extension.

6. The system of claim 1, wherein the opening ramp is a protrusion with an increasing height.

7. The system of claim 1, wherein the cap has at least one latch engaging into a toothing of the connected coupling member.

8. The system of claim 1, wherein the container is a bottle.

9. The system of claim 1, wherein the container comprises a fluid, a liquid, a gas, a solid or mixtures thereof.

10. A method for controlling the provision of a material from a container, comprising the steps of:
   mounting a cap to the container, wherein the cap comprises an unbroken seal;
   mounting a coupling member to a dispenser unit or providing the dispenser unit with a coupling member, wherein at least the coupling member comprises a ramp with increasing heights directed towards the outer surface of the seal of the cap;
   connecting the cap and the coupling member through a combination of an internal and an external thread;
   applying a pressure to the seal by twisting the cap and the coupling member against each other; and
   breaking the seal along a breaking line for opening of the seal.

11. The method of claim 10, wherein a twist-back of the cap and the dispenser unit is prevented by at least one latch of the cap engaging into a toothing of the dispenser unit.

12. The method of claim 10, wherein the cap and the dispenser unit are brought by twisting from an inactivated position with the unbroken seal and an angle of about 110° to 130° with respect to the two parts to an activated position when the connected container and dispenser unit are aligned with respect to their longitudinal extension.

13. The method of claim 11, wherein the cap and the dispenser unit are brought by twisting from an inactivated position with an unbroken seal and an angle of about 110° to 130° with respect to the two parts to an activated position when the connected container and the dispenser unit are aligned with respect to their longitudinal extension.

14. A method for sealing of a container comprising a material and coupling of the container to a dispensing unit comprising the step of providing a system comprising two parts,
   a first part is a cap, and
   a second part is a coupling member,
   wherein the cap is configured to be connected to a container and comprises a seal for sealing of the container, wherein the seal of the cap is surrounded by a predetermined breaking line for opening of the seal, and the cap further comprises a seal ramp directed towards the coupling member that is configured to be mounted to a dispenser unit, wherein the coupling member comprises an opening ramp that is directed towards the cap, and wherein the two parts comprise an external and an internal thread, respectively, so that they can be connected and twisted against each other for their coupling while an axial movement of first and second part in the longitudinal direction of any one of both parts is impossible, wherein the seal ramp and the opening ramp get in contact when the cap is coupled through a rotational movement to the coupling member, wherein at least one of the seal ramp and the opening ramp has an increasing height regarding the respective other ramp.

* * * * *